(12) United States Patent
Childress (10) Patent No.: US 11,987,035 B2
(45) Date of Patent: May 21, 2024

(54) METHODS OF FORMING A DRY FLOOR ASSEMBLY

(71) Applicant: THE BOEING COMPANY, Chicago, IL (US)

(72) Inventor: Jamie Childress, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 17/468,734

(22) Filed: Sep. 8, 2021

(65) Prior Publication Data

US 2023/0071212 A1 Mar. 9, 2023

(51) Int. Cl.
| | |
|---|---|
| *B32B 38/16* | (2006.01) |
| *B08B 1/12* | (2024.01) |
| *B08B 3/08* | (2006.01) |
| *B32B 3/26* | (2006.01) |
| *B32B 9/00* | (2006.01) |
| *B32B 9/04* | (2006.01) |
| *B32B 15/18* | (2006.01) |
| *B32B 27/40* | (2006.01) |
| *B32B 37/18* | (2006.01) |

(Continued)

(52) U.S. Cl.
CPC .............. *B32B 38/162* (2013.01); *B08B 1/12* (2024.01); *B08B 3/08* (2013.01); *B32B 3/266* (2013.01); *B32B 9/007* (2013.01); *B32B 9/041* (2013.01); *B32B 9/045* (2013.01); *B32B 15/18* (2013.01); *B32B 27/40* (2013.01); *B32B 37/182* (2013.01); *B64C 1/18* (2013.01); *B32B 2471/00* (2013.01); *E03D 9/00* (2013.01)

(58) Field of Classification Search
CPC ....... B32B 38/162; B32B 3/266; B32B 9/007; B32B 9/041; B32B 9/045; B32B 15/18; B32B 27/40; B32B 37/182; B32B 2471/00; B32B 2262/106; B32B 2605/003; B32B 15/12; B32B 27/10; B32B 29/002; B08B 1/002; B08B 3/08; B64C 1/18; E03D 9/00; B64D 11/02
See application file for complete search history.

(56) References Cited

U.S. PATENT DOCUMENTS

| | | |
|---|---|---|
| 8,756,831 B2 | 6/2014 | Spanks et al. |
| 10,065,740 B2 | 9/2018 | Childress |

(Continued)

FOREIGN PATENT DOCUMENTS

| | | |
|---|---|---|
| JP | H1171554 | 3/1999 |
| JP | 2002302072 | 10/2002 |

OTHER PUBLICATIONS

Ebnesajjad, "Surface Treatment of Materials for Adhesion Bonding," Second Edition, 2014, 2006 Elsevier Inc. (chapter 6). (Year: 2014).*

(Continued)

*Primary Examiner* — Cynthia L Schaller
(74) *Attorney, Agent, or Firm* — Joseph M. Butscher; The Small Patent Law Group, LLC (57) ABSTRACT

A method of forming a dry floor assembly includes cleaning an upper layer with methyl ethyl ketone (MEK) prior to bonding the upper layer to a carbon wicking layer. Said cleaning removes release agent from the upper layer. The method also includes bonding the upper layer to the carbon wicking layer after said cleaning.

21 Claims, 7 Drawing Sheets

(51) Int. Cl.
   *B64C 1/18* (2006.01)
   *E03D 9/00* (2006.01)

(56) References Cited

U.S. PATENT DOCUMENTS

| | | |
|---|---|---|
| 10,982,439 B2 | 4/2021 | Childress |
| 2004/0009344 A1* | 1/2004 | Krienke ................ B05D 3/102 |
| | | 428/328 |
| 2012/0321801 A1* | 12/2012 | Cordaro .................. C11D 9/08 |
| | | 427/299 |
| 2017/0283062 A1* | 10/2017 | Childress ................ B08B 5/04 |
| 2019/0085212 A1* | 3/2019 | Kandapallil ...... E04F 15/02155 |
| 2020/0018065 A1 | 1/2020 | Childress |
| 2021/0016894 A1 | 1/2021 | Childress |

OTHER PUBLICATIONS

U.S. Appl. No. 16/895,937, filed Jun. 8, 2020.
U.S. Appl. No. 63/115,124, filed Nov. 18, 2020.
Extended European Search Report for EP 22194422.6-1015, dated Jan. 23, 2023.

* cited by examiner

METHODS OF FORMING A DRY FLOOR ASSEMBLY

FIELD OF THE DISCLOSURE

Embodiments of the present disclosure generally relate to methods of forming a dry floor assembly, such as can be used within a lavatory of a vehicle.

BACKGROUND OF THE DISCLOSURE

Commercial aircraft are used to transport passengers between various locations. During a flight—particularly a trans-oceanic or other long haul flight—passengers are typically confined within certain areas (for example, cabins) of an aircraft. Various individuals (such as passengers, pilots, flight attendants, and the like) use certain internal portions of an aircraft during a flight. For example, numerous individuals may use a lavatory within an internal cabin during a flight.

As can be appreciated, with each use, the cleanliness of a lavatory onboard an aircraft may be compromised. Individuals onboard may be sensitive to health risks presented by a frequently-used lavatory onboard an aircraft. Indeed, as individuals use a lavatory onboard an aircraft, the likelihood of germs and bacteria therein increases.

An aircraft lavatory is generally cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights.

With repeated use, portions of the floor of the lavatory may be covered with liquids. Even after being cleaned, the floor of the lavatory may be wet from cleaning fluids. A wet lavatory floor may be unsettling to individuals, even if they know the floor is clean. That is, a wet floor may give the impression of unsanitary conditions. Further, a wet floor may pose a safety hazard in that an individual may slip and fall on the wet floor.

Accordingly, dry floor assemblies have been developed. Examples of such dry floor assemblies include U.S. Pat. No. 10,065,740, entitled "Systems and Methods for Cleaning a Lavatory Floor," and U.S. Pat. No. 10,982,439, entitled "Dry Floor Liquid Disposal System."

A known dry floor assembly includes a top hydrophobic layer bonded to a thick middle carbon wicking layer, which, in turn, is bonded to a perforated steel backing. The carbon wicking layer is configured to facilitate water distribution and pass flammability requirements. However, it has been found that, over time, the top layer and the steel back can interfere with the ability of the carbon wicking layer to pass water therethrough. For example, the wicking layer can become choked with certain chemicals, thereby reducing an ability to effectively pass water.

SUMMARY OF THE DISCLOSURE

A need exists for a method of forming a dry floor assembly that reduces a potential of a wicking layer from being contaminated with chemicals that could otherwise reduce an ability to wick and pass water. Further, a need exists for a dry floor assembly that maintains an ability of the wicking layer to pass water over time.

With those needs in mind, certain embodiments of the present disclosure provide a method of forming a dry floor assembly, the method including cleaning an upper layer with methyl ethyl ketone (MEK) prior to bonding the upper layer to a carbon wicking layer, wherein said cleaning removes release agent from the upper layer; and bonding the upper layer to the carbon wicking layer after said cleaning.

In at least one embodiment, said cleaning includes using one or more brushes to wash the upper layer with the MEK.

In at least one example, the method also includes washing the upper layer with one or both of water or detergent after said cleaning the upper layer with the MEK. As a further example, said washing the upper layer with one or both of the water or the detergent includes using one or more brushes to wash the upper layer with the one or both of the water or the detergent. In at least one example, the method also includes rinsing the upper layer with water after said cleaning the upper layer with the MEK and said washing the upper layer with the one or both of the water or the detergent.

In at least one example, the method also includes pre-washing the carbon wicking layer with water before said bonding the upper layer to the carbon wicking layer, wherein said pre-washing removes excess polyvinyl acetate (PVA) from the carbon wicking layer.

In at least one embodiment, the method also includes priming only a first surface of a lower support layer, wherein a second surface opposite from the first surface is unprimed; and bonding the first surface of the lower support layer to the carbon wicking layer.

In at least one example, the lower support layer is formed of steel. In at least one example, the upper layer includes a urethane grid.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a method of forming a dry floor assembly that includes treating a grid before securing the grid to a carbon wicking layer. In at least one embodiment, the treating includes cleaning the grid with methyl ethyl ketone (MEK), and washing the grid, such as with water or soap and water, before bonding the grid to the carbon wicking layer. In at least one embodiment, the method also includes pre-washing the carbon wicking layer, such as with water, to remove (that is, remove all, substantially all, or a smaller portion) polyvinyl acetate (PVA) therefrom before bonding the grid to the carbon wicking layer. In at least one embodiment, the method also includes priming only one side of a steel support layer. The primed side of the steel support layer is bonded to the carbon wicking layer. It has been found that these steps ensure that the carbon wicking layer is able to effectively pass water therethrough over time. By treating the grid and/or the steep support layer as described, the potential of the carbon wicking layer of being contaminated with chemicals is eliminated, minimized, or otherwise reduced.

Figure 1:
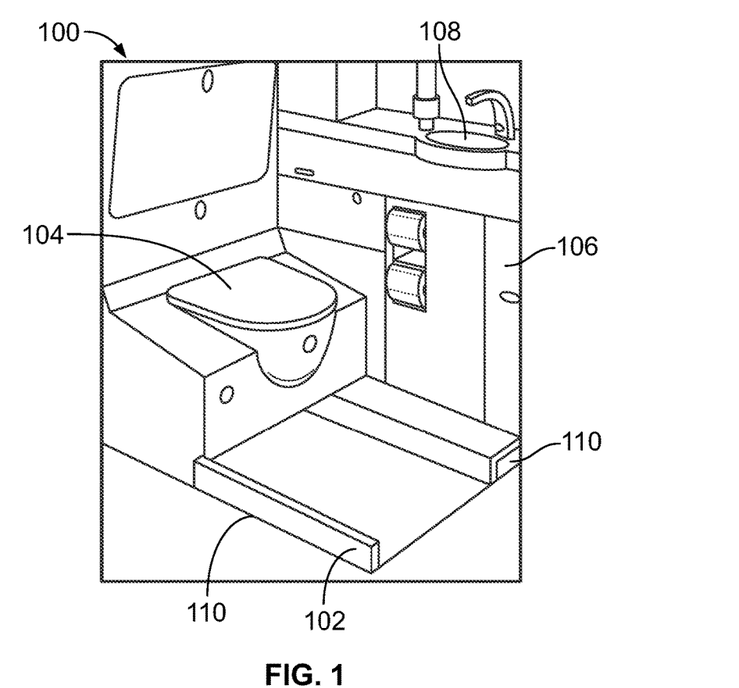
FIG. 1 illustrates a perspective internal view of a lavatory, according to an embodiment of the present disclosure.

FIG. 1 illustrates a perspective internal view of a lavatory 100, according to an embodiment of the present disclosure. The lavatory 100 may be onboard an aircraft, as described above. Optionally, the lavatory 100 may be onboard various other vehicles. In other embodiments, the lavatory 100 may be within a fixed structure, such as a commercial or residential building.

The lavatory 100 includes a base floor 102 that supports a toilet 104, cabinets 106, and a sink 108. The base floor 102 may include opposed brackets 110 that are configured to securely retain a dry floor assembly therebetween. Optionally, the base floor 102 may be or otherwise include the dry floor assembly. Optionally, the dry floor assemblies described herein can be used in settings other than within lavatories. For example, the dry floor assemblies can be used in kitchens, swimming pool decks, patios, porches, and/or various other areas that can be susceptible to wet floors.

Figure 2:
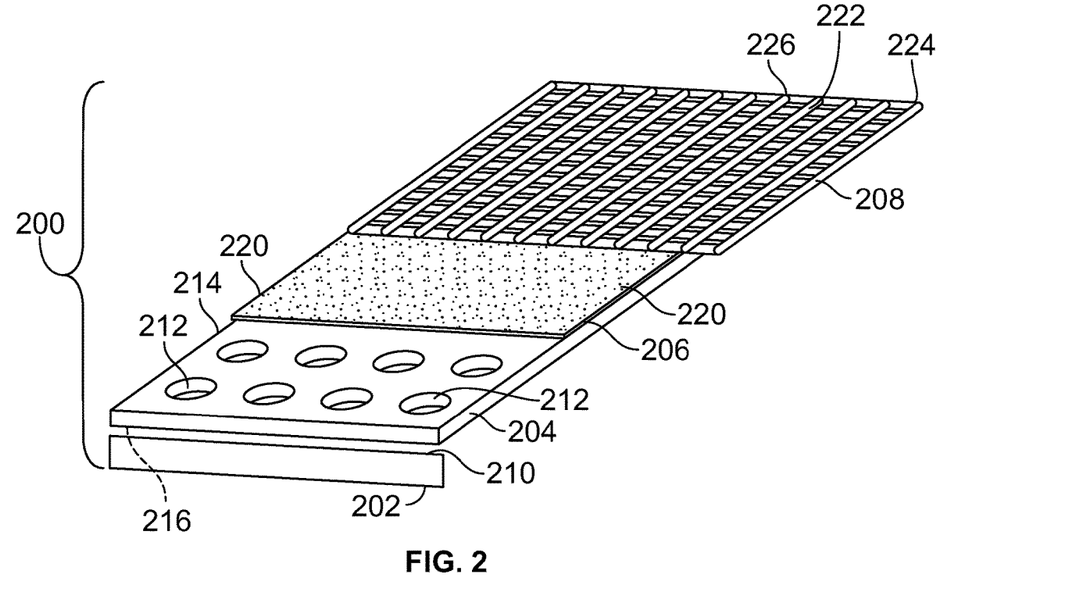
FIG. 2 illustrates a perspective exploded view of a dry floor assembly, according to an embodiment of the present disclosure.

FIG. 2 illustrates a perspective exploded view of a dry floor assembly 200, according to an embodiment of the present disclosure. The dry floor assembly 200 can include a vacuum layer 202 that supports a lower support layer 204. Optionally, the dry floor assembly 200 may not include the vacuum layer 202.

The lower support layer 204 supports an intermediate wicking layer 206. An upper layer 208 is positioned over the wicking layer 206. The upper layer 208 is configured to be directly engaged by an individual. For example, the individual stands on the upper layer 208.

The lower support layer 204, the wicking layer 206, and the upper layer 208 (and optionally, the vacuum layer 202) are sandwiched together to form the dry floor assembly 200. In at least one embodiment, the lower support layer 204, the wicking layer 206, and the upper layer 208 (and optionally, the vacuum layer 202) can be contained within an outer frame, bracket(s), and/or the like, such as the brackets 110 shown in FIG. 1. The lower support layer 204, the wicking layer 206, and the upper layer 208 can be bonded together, for example.

The vacuum layer 202 can include features (such as slots, channels, and/or the like) that may be configured to provide a consistent and even vacuum suction force when connected to a vacuum system. For example, a top surface 210 of the vacuum layer 202 is configured to suction liquid through the lower support layer 204, the wicking layer 206, and the upper layer 208 when the vacuum layer 202 is coupled to an activated vacuum system.

The lower support layer 204 may be a planar sheet of metal. For example, the lower support layer 204 may be formed of steel. In this manner, the lower support layer 204 provides a steel backing for the wicking layer 206. The lower support layer 204 may include a plurality of perforations 212 (such as holes, openings, channels, or the like) that allow liquid to be drawn therethrough. As shown, the perforations 212 can be circular openings formed through the lower support layer 204. The perforations 212 extend from and through opposed top and bottom surfaces 214 and 216, respectively, of the lower support layer 204. In at least one embodiment, the perforations 212 may have a diameter between 0.1 inches-0.2 inches. For example, the perforations 212 may have a diameter of 0.185 inches. Optionally, the diameter of the perforations may be less than 0.1 inches, or greater than 0.2 inches.

The wicking layer 206 is a carbon wicking layer. The carbon wicking layer provides an effective wicking layer that is also non-flammable. That is, the carbon wicking layer facilitates water distribution while also passing non-flammability requirements (such as with respect to vehicles, such as commercial aircraft). For example, the wicking layer 206 is a carbon veil. The carbon wicking layer 206 is black, which can be preferred for lavatories within various commercial aircraft, which include black floors. In at least one embodiment, the wicking layer 206 is or otherwise includes a carbon paper, but is not a woven product. The carbon paper is held together by an adhesive, such as polyvinyl acetate (PVA), which is water soluble. As an example, the wicking layer 206 can be 20 $g/m^2$ carbon fiber and a 5% PVA binder veil. The wicking layer 206 provides a wicking fabric that wicks liquid in a similar manner as a fabric wicks liquid.

In at least one embodiment, the upper layer 208 is or otherwise includes a grid 222, such as may be formed of urethane. For example, the upper layer 208 can be formed of 892 urethane with a 10% 422 flame retardant. The grid 222 provides openings 226 therethrough. The openings 226 are configured to prevent or otherwise reduce liquid beading on the upper layer 208.

In operation, liquid deposited onto the upper layer 208 passes through the openings 226. The wicking layer 206 draws the liquid away from the upper layer 208, and into and through the support layer 204. Optionally, an activated vacuum system can be coupled to the vacuum layer 202, and suctions the liquid on or within the wicking layer 206. The liquid then passes through the perforations 212 of the lower support layer 204 and out of the dry floor assembly 200 through an outlet that fluidly connects to the vacuum system through a conduit (such as a hose, tube, or the like).

Figure 3:
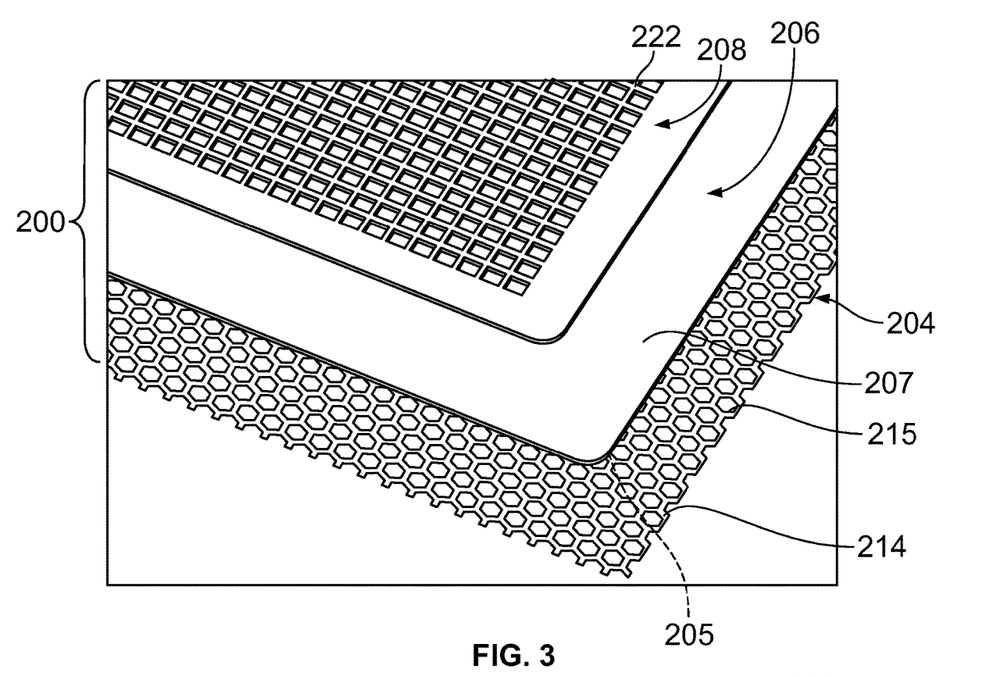
FIG. 3 illustrates a perspective top view of a dry floor assembly, according to an embodiment of the present disclosure.

FIG. 3 illustrates a perspective top view of the dry floor assembly 200, according to an embodiment of the present disclosure. For the sake of clarity, the lower support layer 204 is shown separated from the wicking layer 206, and the upper layer 208 is shown separated from the wicking layer 206. As noted, the dry floor assembly 200 may or may not include the vacuum layer 202 (shown in FIG. 2).

Figure 4:
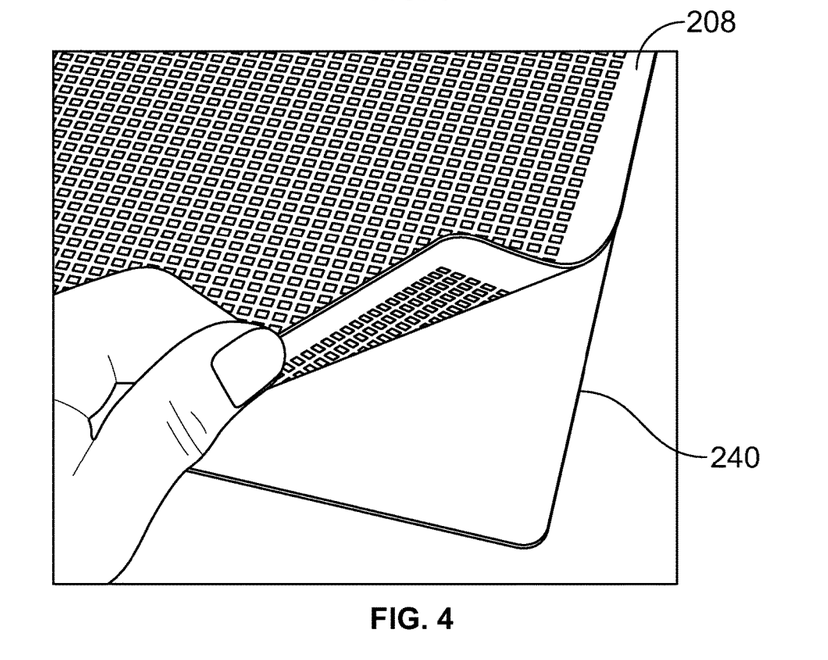
FIG. 4 illustrates a perspective top view of an upper layer being removed from a tool, according to an embodiment of the present disclosure.

FIG. 4 illustrates a perspective top view of the upper layer 208 being removed from a tool 240, according to an embodiment of the present disclosure. As noted, in at least one embodiment, the upper layer 208 is formed of urethane. The upper layer 208 is formed and molded on the tool, which can be a silicon tool. In order to ensure that the upper layer 208 is safely removed from the tool 240, the upper layer 208 and/or the tool 240 is coated with a release agent, such as Frekote 1711, for example. Optionally, various other known release agents can be used. Before securing the upper layer 208 to the wicking layer 206 (shown in FIGS. 2 and 3), the release agent is removed from the upper layer 208.

Figure 5:
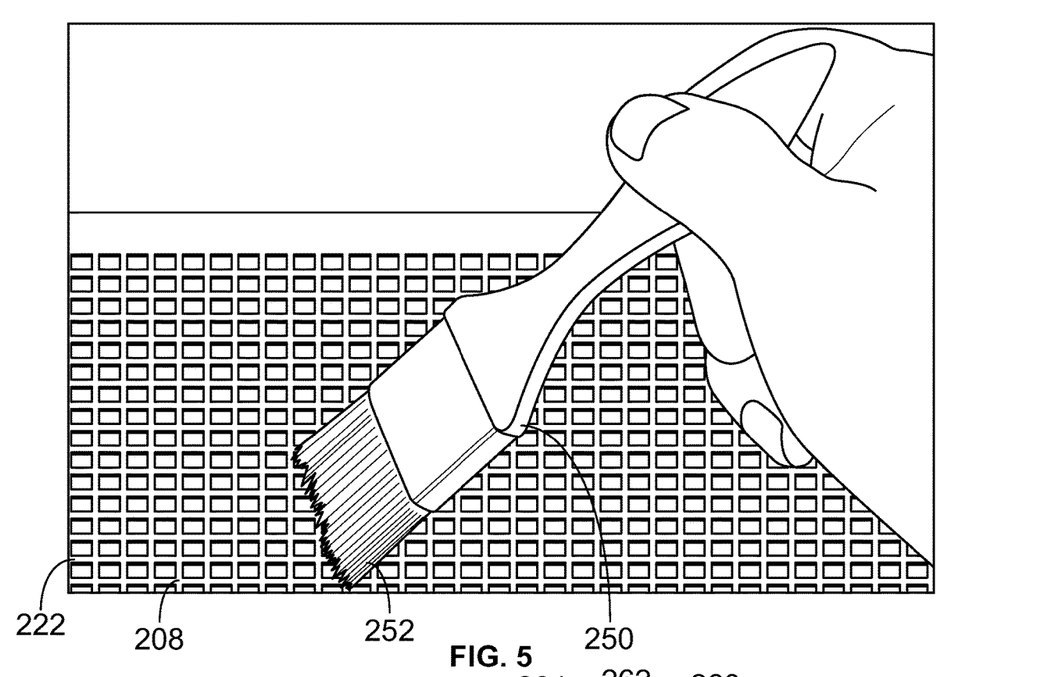
FIG. 5 illustrates a perspective top view of the upper layer being cleaned with methyl ethyl ketone (MEK) to initially remove release agent, according to an embodiment of the present disclosure.

FIG. 5 illustrates a perspective top view of the upper layer 208 being cleaned with methyl ethyl ketone (MEK) to initially remove (for example, all, substantially all, or a portion of) release agent, according to an embodiment of the present disclosure. A brush 250 can be used to provide mechanical agitation to apply the MEK 252 to the upper layer 208. Optionally, the upper layer 208 can be immersed in a bath of MEK 252. However, it has been found that using the brush 250 to apply the MEK 252 to all portions of the upper layer 208 (including upper and lower surfaces, side surfaces, portions between openings, and the like) effectively and efficiently applies the MEK 252 to the upper grid 208. The MEK 252 acts to remove the release agent (for example, removes all, substantially all, or at least a portion of the release agent) from grid 222 of the upper layer 208. By removing the release agent (or at least a portion thereof) from the upper layer 208 with the MEK 252, the wicking layer 206 is less susceptible to being contaminated by the release agent.

In at least one embodiment, the upper layer 208 can be cleaned with MEK multiple times. For example, the upper layer 208 can be cleaned with MEK two or more times. Each time, a different brush can be used to apply the MEK to the upper layer 208.

Figure 6:
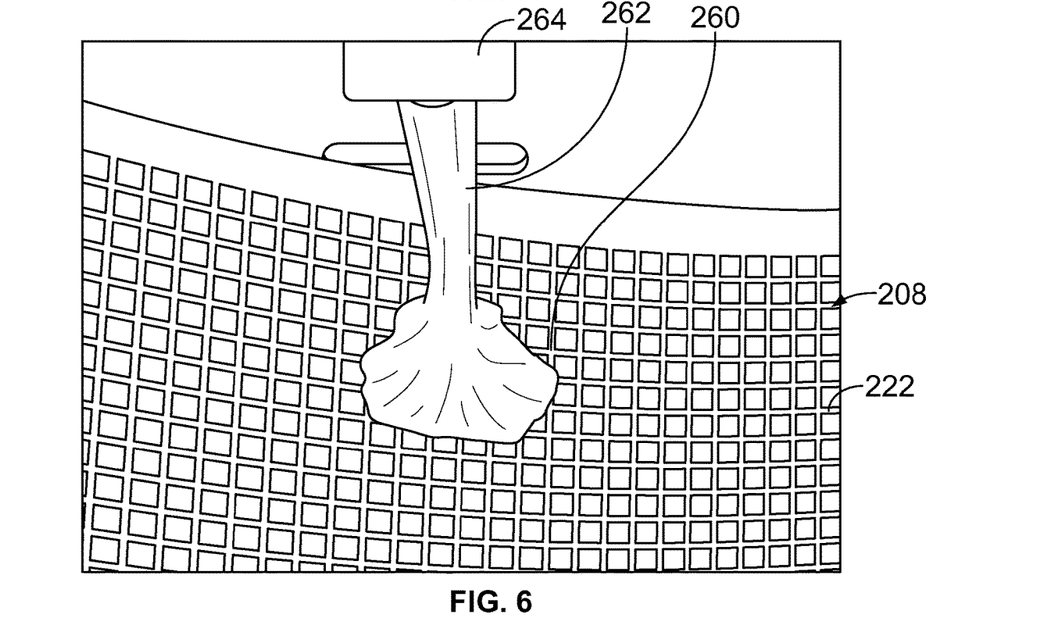
FIG. 6 illustrates a perspective top view of the upper layer being cleaned to remove excess release agent and MEK, according to an embodiment of the present disclosure.

FIG. 6 illustrates a perspective top view of the upper layer 208 being further cleaned to remove excess release agent and MEK, according to an embodiment of the present disclosure. After the upper layer 208 has been cleaned with MEK 252 (as shown and described in FIG. 5), the upper layer 208 is then cleaned (for example, showered, scrubbed, and/or the like) with water 260 by itself, and/or with a detergent 262, such as soap (for example, dish soap). By washing the upper layer 208 with the water 260 and/or the detergent 262, excess release agent and MEK is removed from the upper layer 208. By removing any additional release agent and MEK from the upper layer 208, the wicking layer 206 is less susceptible to contamination.

In at least one embodiment, a brush (the same as, or different from the brush 250) can be used to scrub the upper layer 208 as it is being washed with the water 260 and/or the detergent 262. The brush 250 provides physical agitation to the washing process, which has been found to more effectively and efficiently remove the MEK and the release agent from the upper layer 208. Optionally, a brush may not be used. Instead, the upper layer 208 can be moved underneath a faucet 264, for example, from which the water 260 flows. As another example, the upper layer 208 can be immersed in a bath of water by itself, or with the detergent.

After the upper layer 208 has been rinsed with the water 260 and the detergent 262, the upper layer 208 can be further cleaned (for example, rinsed) with water to remove remaining detergent, MEK, and/or release agent. A brush may or may not be used during the rinsing.

The upper layer 208 being cleaned with MEK, and then cleaned with water by itself or with detergent removes the release agent from the upper layer 208. The water and detergent removes the MEK and any remaining release agent from the upper layer 208. Further rinsing the upper layer 208 with water removes any remaining MEK, release agent, and detergent from the upper layer 208. Accordingly, the upper layer 208 is devoid of chemical that could otherwise contaminate the wicking layer 206 (shown in FIGS. 2 and 3). After the upper layer 208 has been cleaned in such fashion, the upper layer 208 can be bonded to the wicking layer 206.

Referring to FIGS. 2-6, in at least one embodiment, before the upper layer 208, which has been cleaned, is bonded to the wicking layer 206, the wicking layer 206 itself can be washed (or pre-washed), such as with water. A brush may or may not be used during when the wicking layer 206 is washed. By washing the wicking layer 206 with water prior to the wicking layer 206 being bonded to the upper layer 208 and the lower support layer 204, excess PVA is removed from outer surfaces of the wicking layer 206. Removal of the excess PVA increases the wicking ability of the wicking layer 206. The wicking layer 206 is dried of water and any other liquids before being bonded to the wicking layer 206. Optionally, the wicking layer 206 may not be washed in such fashion.

Figure 7:
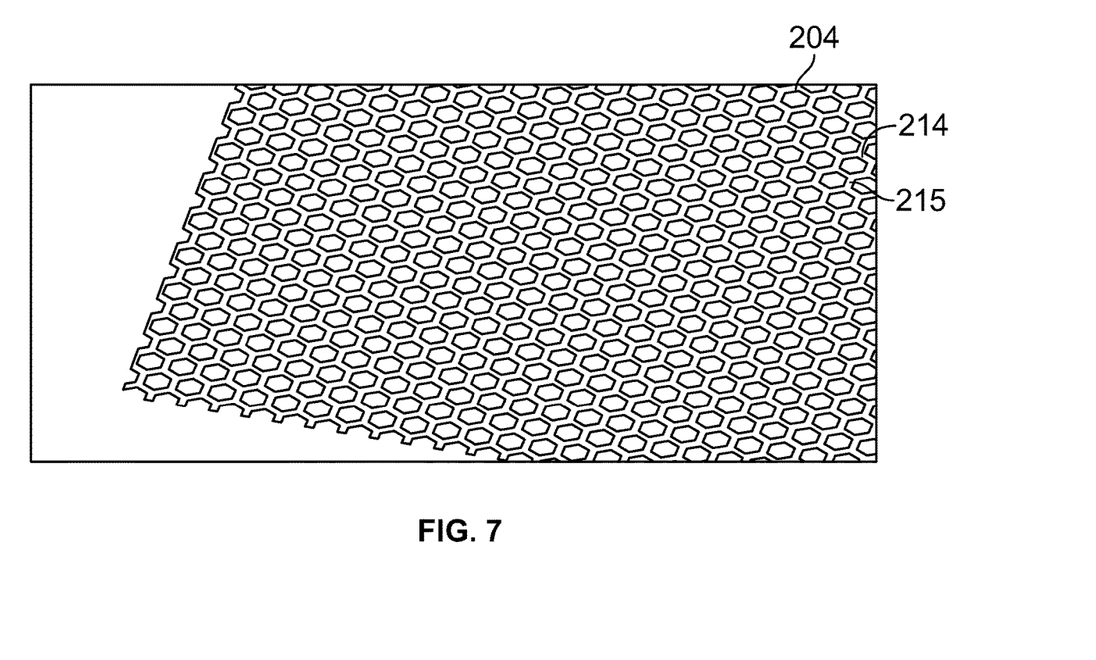
FIG. 7 illustrates a top view of the lower support layer, according to an embodiment of the present disclosure.

FIG. 7 illustrates a top view of the lower support layer 204, according to an embodiment of the present disclosure. The first or top surface 214 of the lower support layer 204 is primed (that is, coated with a primer 215, such as brush-on primer or paint). The primed top surface 214 is configured to be bonded to a lower surface 205 of the wicking layer 206 (shown in FIG. 3).

Figure 8:
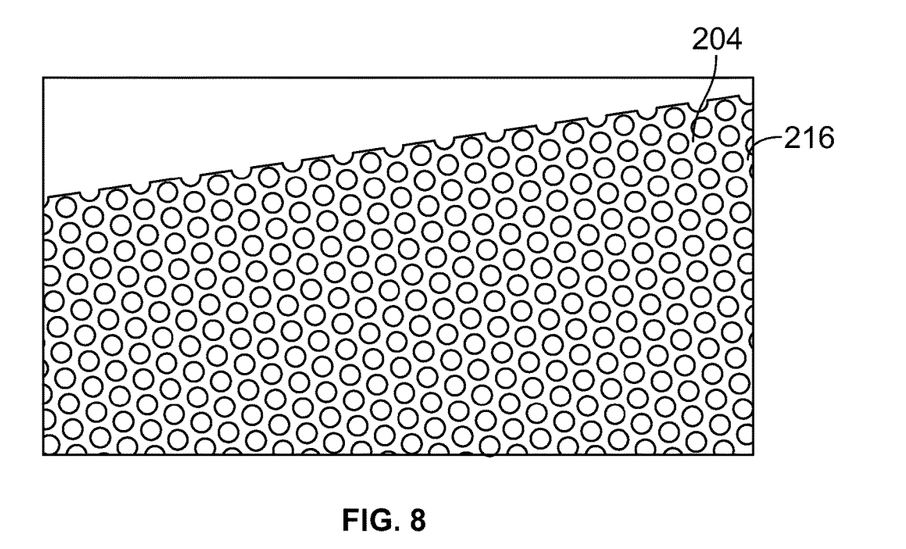
FIG. 8 illustrates a bottom view of the lower support layer, according to an embodiment of the present disclosure.

FIG. 8 illustrates a bottom view of the lower support layer 204, according to an embodiment of the present disclosure. The second or bottom surface 216 (opposite from the top surface 214 shown in FIG. 7) is unprimed (for example, bare steel that is not coated with primer or paint). Referring to FIGS. 7 and 8, only the top surface 214 (which is configured to be directly bonded to the wicking layer 206) is primed, while the opposite bottom surface 214 is unprimed. The bottom surface 216 is configured to directly abut a pan, vacuum layer, a floor, and/or the like.

Bonding the primed top surface 214 to the wicking layer 206 increases bonding performance, and decreases the appearance of rust in the wicking layer 206 after water has been introduced into the wicking layer 206. It has been found that leaving the opposite bottom surface 216 unprimed reduces the time required for the dry floor assembly 200 to absorb water. It has been found that when both the top surface 214 and the bottom surface 216 are primed, the wicking layer 206 stops wicking water over time. However, it has also been found that leaving the bottom surface 216 unprimed, the wicking layer 206 continues to effectively wick water indefinitely. In general, it seems that rust (such as on the unprimed bottom surface 216) acts as a wicking layer protectant.

Optionally, the lower support layer 204 may not be used. That is, the dry floor assembly 200 shown in FIGS. 2 and 3 may not include the lower support layer 204. Instead, the upper layer 208 can be supported by a metal frame, such as an aluminum, steel, or titanium frame that extends along a periphery of the upper layer 208, for example.

Referring to FIGS. 2-8, the different layers of the dry floor assembly 200 are first treated before being coupled together, in order to ensure that the carbon wicking layer 206 is not contaminated with chemicals that could otherwise reduce wicking ability. In particular, the upper layer 208 is washed with MEK to remove release agent therefrom. After being washed with MEK, the upper layer 208 is then washed with water, by itself, or with detergent to remove any remaining release agent and the MEK therefrom. The upper layer 208 can then be further washed (for example, rinsed) with water to remove remaining release agent, MEK, and/or detergent. The carbon wicking layer 206 can be pre-washed with water to remove excess PVA. The lower support layer 204 can have only a single surface primed. The primed surface is the surface configured to be bonded to the carbon wicking layer 206. The opposite surface of the lower support layer 204 is unprimed.

After the upper layer 208 is washed with MEK, then water (and optionally detergent), and optionally further washed with water, the upper layer 208 is bonded to the carbon wicking layer 206, such as upper surface 207 of the carbon wicking layer 206. The primed top surface 214 of the lower support layer 204 is bonded to the lower surface 205 of the carbon wicking layer 206, while the opposite bottom surface 216 is unprimed.

Figure 9:
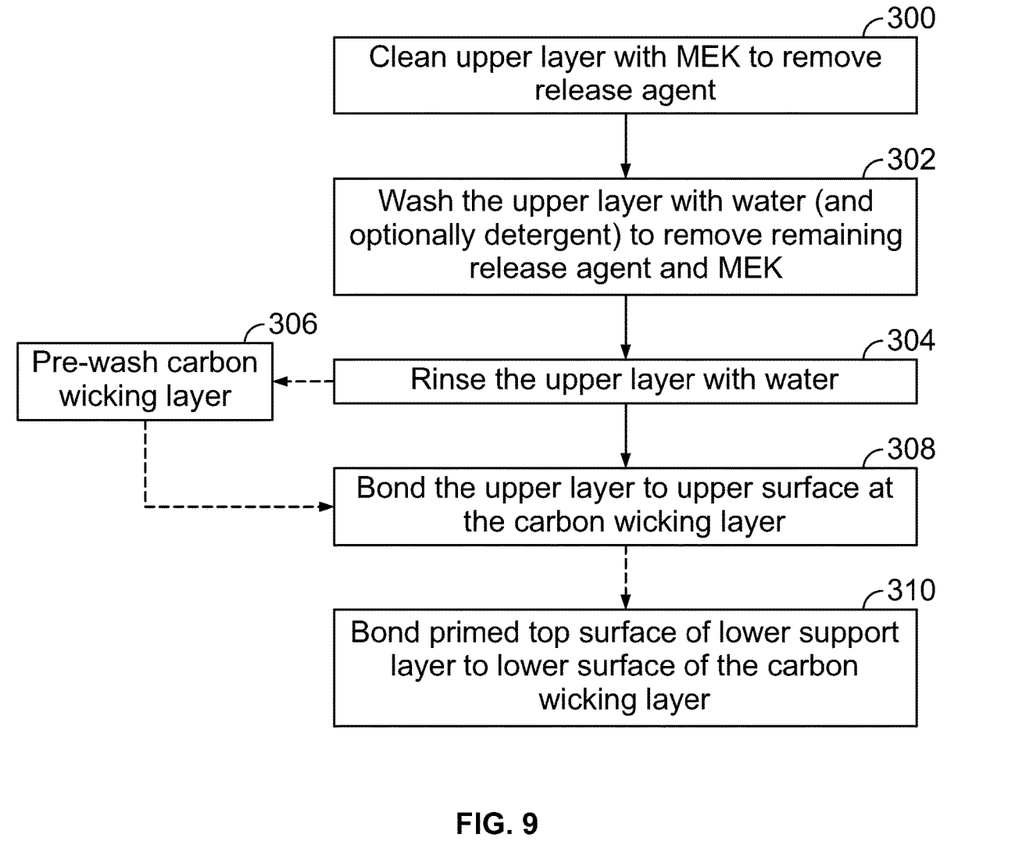
FIG. 9 illustrates a flow chart of a method of forming a dry floor assembly, according to an embodiment of the present disclosure.

FIG. 9 illustrates a flow chart of a method of forming a dry floor assembly, according to an embodiment of the present disclosure. Referring to FIGS. 2-9, at 300, the upper layer 208 is cleaned with MEK to remove release agent from the upper layer 208. Step 300 can be repeated one or more times, as desired. Next, at 302, the upper layer 208 is washed with water (and optionally detergent) to remove remaining release agent and MEK from the upper layer 208. Step 302 can be repeated one or more times, as desired. At 304, the upper layer 208 is rinsed (for example, washed) with water to remove any remaining release agent, MEK, and/or detergent from the upper layer 208. Step 304 can be repeated one or more times, as desired.

At 306, the carbon wicking layer 206 can be pre-washed, such as with water. Pre-washing the carbon wicking layer 206 removes excess PVA therefrom. Optionally, the method may not include 306.

At 308, the upper layer 208 (which has been washed as described herein) is then bonded to the upper surface 207 of the carbon wicking layer 206. At 310, the primed top surface 214 of the lower support layer 204 is bonded to the lower surface 205 of the carbon wicking layer 206. The bottom surface 216 is unprimed. That is, only the top surface 214 of the lower support layer 204 is primed. Optionally, the method may not include step 310.

Figure 10:
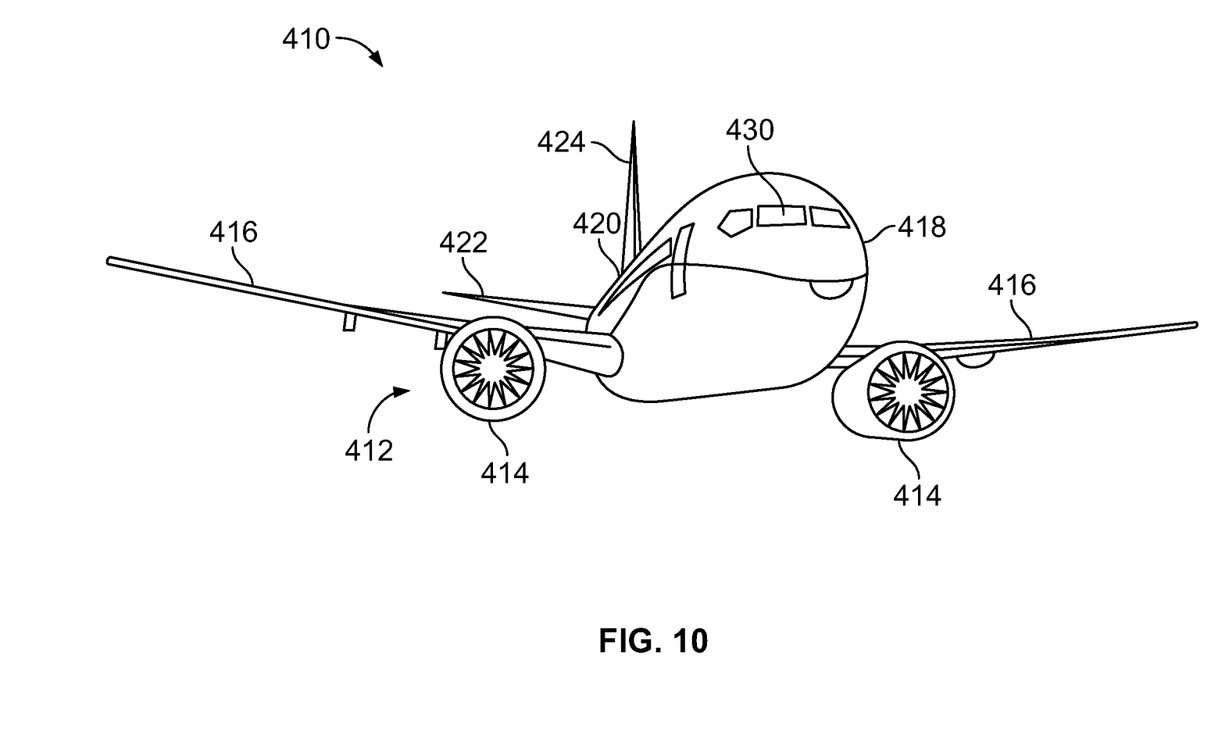
FIG. 10 illustrates a perspective front view of an aircraft, according to an embodiment of the present disclosure.

FIG. 10 illustrates a perspective front view of an aircraft 410, according to an embodiment of the present disclosure. The aircraft 410 includes a propulsion system 412 that includes engines 414, for example. Optionally, the propulsion system 412 may include more engines 414 than shown. The engines 414 are carried by wings 416 of the aircraft 410. In other embodiments, the engines 414 may be carried by a fuselage 418 and/or an empennage 420. The empennage 420 may also support horizontal stabilizers 422 and a vertical stabilizer 424.

The fuselage 418 of the aircraft 410 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. The dry floor assembly 200, as shown and described with respect to FIGS. 2-9, can be used within the internal cabin 430, such as within a lavatory of the internal cabin.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 11:
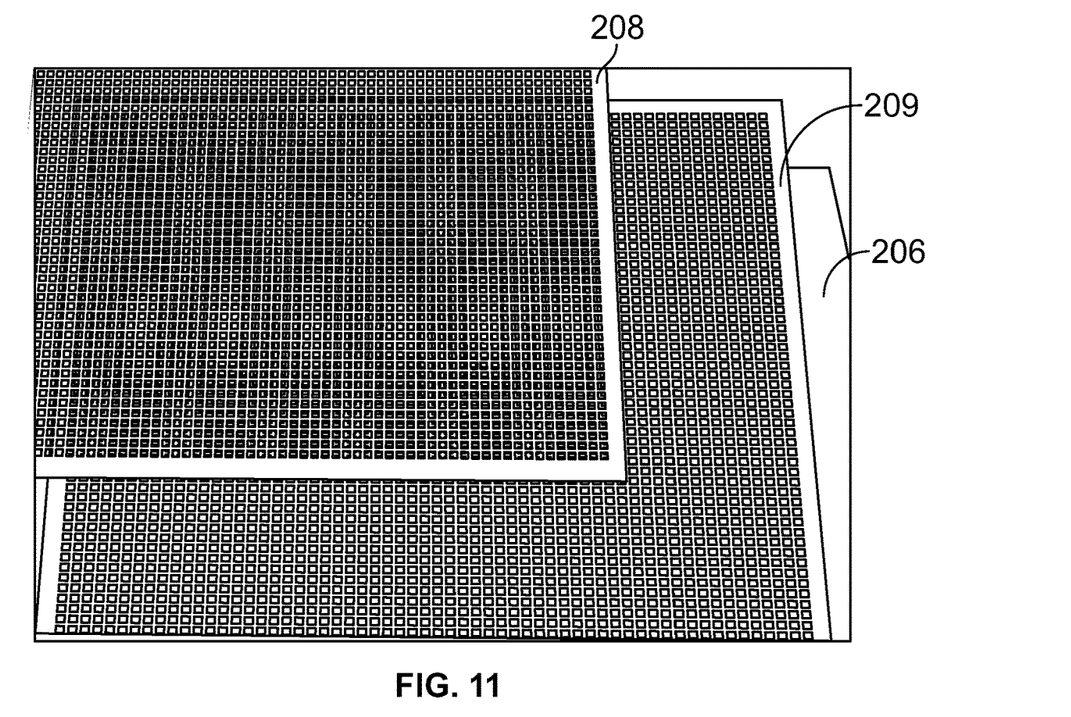
FIG. 11 illustrates a perspective top view of a dry floor assembly, according to an embodiment of the present disclosure.

FIG. 11 illustrates a perspective top view of the dry floor assembly 200, according to an embodiment of the present disclosure. In this embodiment, the dry floor assembly 200 includes the upper layer 208 secured over an interlayer 209, such as formed of metal, plastic, and/or the like. The interlayer 209 is secured over the carbon wicking layer 206.

Figure 12:
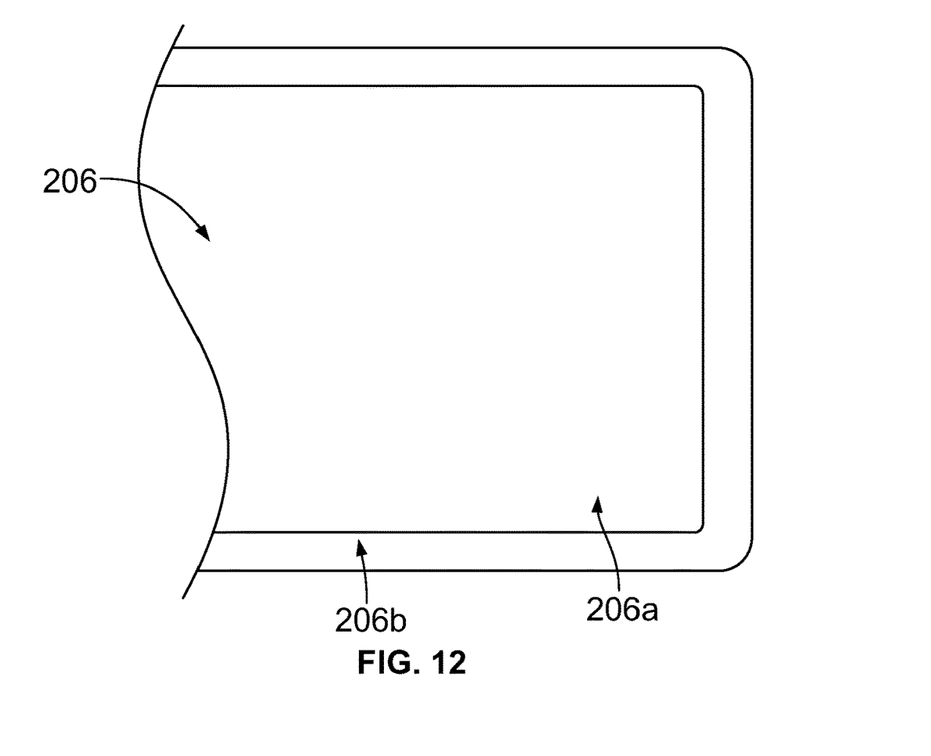
FIG. 12 illustrates a top view of a wicking layer, according to an embodiment of the present disclosure.

FIG. 12 illustrates a top view of a wicking layer 206, according to an embodiment of the present disclosure. In this embodiment, the wicking layer 206 includes an interior carbon wicking sheet 206a bounded and supported by an outer rim 206b, which can be formed of steel, for example.

Referring to FIGS. 9, 11, and 12, instead of steps 308 and 310, in at least one embodiment, the method can include (after step 304 and/or 306), bonding the upper layer 208 to an interlayer, such as the interlayer 209. Next, the method can include bonding the interlayer to the upper surface of the carbon wicking layer 206. Next, a rim, such as the rim 206b, can be bonded to a periphery of a lower surface of the carbon wicking layer 206 (such as around a lower surface of the carbon wicking sheet 206a).

Further, the disclosure comprises examples according to the following clauses:

Clause 1. A method of forming a dry floor assembly, the method comprising:
  cleaning an upper layer with methyl ethyl ketone (MEK) prior to bonding the upper layer to a carbon wicking layer, wherein said cleaning removes release agent from the upper layer; and
  bonding the upper layer to the carbon wicking layer after said cleaning.

Clause 2. The method of Clause 1, wherein said cleaning comprises using one or more brushes to wash the upper layer with the MEK.

Clause 3. The method of Clauses 1 or 2, further comprising washing the upper layer with one or both of water or detergent after said cleaning the upper layer with the MEK.

Clause 4. The method of Clause 3, wherein said washing the upper layer with one or both of the water or the detergent comprises using one or more brushes to wash the upper layer with the one or both of the water or the detergent.

Clause 5. The method of Clauses 3 or 4, further comprising rinsing the upper layer with water after said cleaning the upper layer with the MEK and said washing the upper layer with the one or both of the water or the detergent.

Clause 6. The method of any of Clauses 1-5, further comprising pre-washing the carbon wicking layer with water before said bonding the upper layer to the carbon wicking layer, wherein said pre-washing removes excess polyvinyl acetate (PVA) from the carbon wicking layer.

Clause 7. The method of any of Clauses 1-6, further comprising:

priming only a first surface of a lower support layer, wherein a second surface opposite from the first surface is unprimed; and bonding the first surface of the lower support layer to the carbon wicking layer.

Clause 8. The method of Clause 7, wherein the lower support layer is formed of steel.

Clause 9. The method of any of Clauses 1-8, wherein the upper layer comprises a urethane grid.

Clause 10. A method of forming a dry floor assembly, the method comprising:

cleaning an upper layer with methyl ethyl ketone (MEK) prior to bonding the upper layer to a carbon wicking layer, wherein said cleaning removes release agent from the upper layer;

washing the upper layer with one or both of water or detergent after said cleaning the upper layer with the MEK;

rinsing the upper layer with water after said cleaning the upper layer with the MEK and said washing the upper layer with the one or both of the water or the detergent; and bonding the upper layer to the carbon wicking layer after said cleaning, said washing, and said rinsing.

Clause 11. The method of Clause 10, wherein said cleaning comprises using one or more brushes to wash the upper layer with the MEK.

Clause 12. The method of Clauses 10 or 11, wherein said washing the upper layer with one or both of the water or the detergent comprises using one or more brushes to wash the upper layer with the one or both of the water or the detergent.

Clause 13. The method of any of Clauses 10-12, further comprising pre-washing the carbon wicking layer with water before said bonding the upper layer to the carbon wicking layer, wherein said pre-washing removes excess polyvinyl acetate (PVA) from the carbon wicking layer.

Clause 14. The method of any of Clauses 10-13, further comprising:

priming only a first surface of a lower support layer, wherein a second surface opposite from the first surface is unprimed; and bonding the first surface of the lower support layer to the carbon wicking layer.

Clause 15. The method of any of Clauses 10-14, wherein the lower support layer is formed of steel.

Clause 16. The method of any of Clauses 10-15, wherein the upper layer comprises a urethane grid.

Clause 17. A method of forming a dry floor assembly, the method comprising:

cleaning an upper layer with methyl ethyl ketone (MEK) prior to bonding the upper layer to a carbon wicking layer, wherein said cleaning removes release agent from the upper layer, and wherein said cleaning comprises using one or more brushes to wash the upper layer with the MEK;

washing the upper layer with one or both of water or detergent after said cleaning the upper layer with the MEK, wherein said washing the upper layer with one or both of the water or the detergent comprises using the one or more brushes to wash the upper layer with the one or both of the water or the detergent;

rinsing the upper layer with water after said cleaning the upper layer with the MEK and said washing the upper layer with the one or both of the water or the detergent;

pre-washing the carbon wicking layer with water before said bonding the upper layer to the carbon wicking layer, wherein said pre-washing removes excess polyvinyl acetate (PVA) from the carbon wicking layer;

bonding the upper layer to the carbon wicking layer after said cleaning, said washing, said rinsing, and said pre-washing; and priming only a first surface of a lower support layer, wherein a second surface opposite from the first surface is unprimed.

Clause 18. The method of Clause 17, further comprising bonding the first surface of the lower support layer to the carbon wicking layer.

Clause 19. The method of Clause 18, wherein the lower support layer is formed of steel.

Clause 20. The method of Clause 19, wherein the upper layer comprises a urethane grid.

As described herein, embodiments of the present disclosure provide methods of forming a dry floor assembly that reduces a potential of a wicking layer from being contaminated with chemicals that could otherwise reduce an ability to wick and pass water. Further, embodiments of the present disclosure provide dry floor assemblies that maintain an ability of the wicking layer to pass water over time.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method of forming a dry floor assembly, the method comprising:
    pre-washing a carbon wicking layer with water before bonding an upper layer to the carbon wicking layer;
    cleaning the upper layer with methyl ethyl ketone (MEK) prior to bonding the upper layer to the carbon wicking layer, wherein said cleaning removes release agent from the upper layer;
    priming, with a primer that differs from the MEK, only a first surface of a lower support layer, wherein a second surface opposite from the first surface is unprimed; and
    bonding the upper layer to the carbon wicking layer after said cleaning.

2. The method of claim 1, wherein said cleaning comprises using one or more brushes to wash the upper layer with the MEK.

3. The method of claim 1, further comprising washing the upper layer with one or both of water or detergent after said cleaning the upper layer with the MEK.

4. The method of claim 3, wherein said washing the upper layer with one or both of the water or the detergent comprises using one or more brushes to wash the upper layer with the one or both of the water or the detergent.

5. The method of claim 3, further comprising rinsing the upper layer with water after said cleaning the upper layer with the MEK, and said washing the upper layer with the one or both of the water or the detergent.

6. The method of claim 1, further comprising removing, by said pre-washing, excess polyvinyl acetate (PVA) from the carbon wicking layer.

7. The method of claim 1, further comprising:
    bonding the first surface of the lower support layer to the carbon wicking layer.

8. The method of claim 7, wherein the lower support layer is formed of steel.

9. The method of claim 1, wherein the upper layer comprises a urethane grid.

10. A method of forming a dry floor assembly, the method comprising:
    pre-washing a carbon wicking layer with water before bonding an upper layer to the carbon wicking layer;
    cleaning the upper layer with methyl ethyl ketone (MEK) prior to bonding the upper layer to a carbon wicking layer, wherein said cleaning removes release agent from the upper layer;
    priming, with a primer that differs from the MEK, only a first surface of a lower support layer, wherein a second surface opposite from the first surface is unprimed;
    washing the upper layer with one or both of water or detergent after said cleaning the upper layer with the MEK;
    rinsing the upper layer with water after said cleaning the upper layer with the MEK and said washing the upper layer with the one or both of the water or the detergent; and
    bonding the upper layer to the carbon wicking layer after said cleaning, said washing, and said rinsing.

11. The method of claim 10, wherein said cleaning comprises using one or more brushes to wash the upper layer with the MEK.

12. The method of claim 10, wherein said washing the upper layer with one or both of the water or the detergent comprises using one or more brushes to wash the upper layer with the one or both of the water or the detergent.

13. The method of claim 10, further comprising removing, by said pre-washing, excess polyvinyl acetate (PVA) from the carbon wicking layer.

14. The method of claim 10, further comprising:
    bonding the first surface of the lower support layer to the carbon wicking layer.

15. The method of claim 10, wherein the lower support layer is formed of steel.

16. The method of claim 10, wherein the upper layer comprises a urethane grid.

17. A method of forming a dry floor assembly, the method comprising:
    cleaning an upper layer with methyl ethyl ketone (MEK) prior to bonding the upper layer to a carbon wicking layer, wherein said cleaning removes release agent from the upper layer, and wherein said cleaning comprises using one or more brushes to wash the upper layer with the MEK;
    washing the upper layer with one or both of water or detergent after said cleaning the upper layer with the MEK, wherein said washing the upper layer with one or both of the water or the detergent comprises using the one or more brushes to wash the upper layer with the one or both of the water or the detergent;
    rinsing the upper layer with water after said cleaning the upper layer with the MEK and said washing the upper layer with the one or both of the water or the detergent;
    pre-washing the carbon wicking layer with water before said bonding the upper layer to the carbon wicking layer, wherein said pre-washing removes excess polyvinyl acetate (PVA) from the carbon wicking layer;
    bonding the upper layer to the carbon wicking layer after said cleaning, said washing, said rinsing, and said pre-washing; and
    priming, with a primer that differs from the MEK, only a first surface of a lower support layer, wherein a second surface opposite from the first surface is unprimed.

18. The method of claim 17, further comprising bonding the first surface of the lower support layer to the carbon wicking layer.

19. The method of claim 18, wherein the lower support layer is formed of steel.

20. The method of claim 19, wherein the upper layer comprises a urethane grid.

21. The method of claim 17, wherein the primer is a paint.

* * * * *